(12) United States Patent
Wells et al.

(10) Patent No.: US 7,920,713 B2
(45) Date of Patent: Apr. 5, 2011

(54) RECORDED VIDEO BROADCAST, STREAMING, DOWNLOAD, AND DISK DISTRIBUTION WITH WATERMARKING INSTRUCTIONS

(75) Inventors: Aaron G. Wells, Piedmont, CA (US); Elliot N. Linzer, Suffern, NY (US)

(73) Assignee: LSI Corporation, Milpitas, CA (US)

( * ) Notice: Subject to any disclaimer, the term of this patent is extended or adjusted under 35 U.S.C. 154(b) by 1388 days.

(21) Appl. No.: 11/017,423

(22) Filed: Dec. 20, 2004

(65) Prior Publication Data

US 2006/0133644 A1 Jun. 22, 2006

(51) Int. Cl.
*G06K 9/00* (2006.01)
*H04K 1/00* (2006.01)

(52) U.S. Cl. ............ 382/100; 382/232; 380/31; 380/42; 380/252; 380/287; 704/270; 704/273; 370/522; 370/523; 370/527; 370/528; 705/57; 705/51; 705/71; 705/75

(58) Field of Classification Search .................. 382/100, 382/103; 713/176; 707/3, 102, 100; 380/22, 380/26, 210, 211, 212; 399/366; 370/529, 370/525, 526, 527; 725/13, 14, 18, 19, 20, 725/21, 31, 38, 39, 40, 41, 61, 88, 90, 102; 381/73.1, 239; 705/57, 51, 71, 75
See application file for complete search history.

(56) References Cited

U.S. PATENT DOCUMENTS

| | | | | |
|---|---|---|---|---|
| 6,256,392 B1 * | 7/2001 | Sako et al. | | 380/203 |
| 6,374,036 B1 * | 4/2002 | Ryan et al. | | 386/94 |
| 6,987,862 B2 * | 1/2006 | Rhoads | | 382/100 |
| 7,006,661 B2 * | 2/2006 | Miller et al. | | 382/100 |
| 7,055,037 B2 * | 5/2006 | Hsia et al. | | 713/176 |
| 7,062,068 B2 * | 6/2006 | Hirai et al. | | 382/100 |
| 7,123,740 B2 * | 10/2006 | McKinley | | 382/100 |
| 7,171,018 B2 * | 1/2007 | Rhoads et al. | | 382/100 |
| 7,359,528 B2 * | 4/2008 | Rhoads | | 382/100 |
| 7,373,513 B2 * | 5/2008 | Levy | | 713/176 |
| 7,454,035 B2 * | 11/2008 | Miller et al. | | 382/100 |
| 7,536,355 B2 * | 5/2009 | Barr et al. | | 705/57 |
| 7,562,392 B1 * | 7/2009 | Rhoads et al. | | 726/26 |
| 2002/0033844 A1 * | 3/2002 | Levy et al. | | 345/744 |
| 2002/0090114 A1 * | 7/2002 | Rhoads et al. | | 382/100 |
| 2003/0056103 A1 * | 3/2003 | Levy et al. | | 713/176 |
| 2004/0128514 A1 * | 7/2004 | Rhoads | | 713/176 |
| 2004/0243814 A1 * | 12/2004 | Nakano et al. | | 713/189 |
| 2005/0058319 A1 * | 3/2005 | Rhoads et al. | | 382/100 |
| 2006/0120560 A1 * | 6/2006 | Davis et al. | | 382/100 |
| 2006/0149683 A1 * | 7/2006 | Shimojima et al. | | 705/59 |
| 2007/0192352 A1 * | 8/2007 | Levy | | 707/102 |

* cited by examiner

*Primary Examiner* — Wesley Tucker
*Assistant Examiner* — Nancy Bitar
(74) *Attorney, Agent, or Firm* — Christopher P. Maiorana, PC

(57) ABSTRACT

An apparatus comprising a first circuit and a second circuit. The first circuit may be configured to analyze an audio-video data stream to determine watermark appropriate information for the audio-video data stream. The second circuit may be configured to communicate the watermark appropriate information either in-band with or out-of-band from a bit stream communicating the audio-video data.

31 Claims, 4 Drawing Sheets

RECORDED VIDEO BROADCAST, STREAMING, DOWNLOAD, AND DISK DISTRIBUTION WITH WATERMARKING INSTRUCTIONS

FIELD OF THE INVENTION

The present invention relates to copy protection generally and, more particularly, to recorded video broadcast, streaming, download, and disk distribution with watermarking instructions.

BACKGROUND OF THE INVENTION

Piracy is a big problem for the audio/visual (A/V) recording industry. Methods to combat the unauthorized copying of digital A/V media include (i) encrypting recorded media and (ii) forensic watermarking. With encrypted recording media, only authorized players are capable of decrypting the information (i.e., digital data), and such players do not allow the digital data to be copied correctly. In forensic watermarking, each distributed copy (e.g., on an optical disk, over a network, etc.), each output from a player, or each playback session, can be somewhat different. The differences can be detected, so that if the content is copied (e.g., using the analog output of a player) the guilty party can be tracked down. Forensic watermarking is used, for example, when pre-release DVDs are given to award judges.

Efficient watermarking utilizes the encoding process and existing content creation and authoring tools to introduce the watermarking technology at minimal overall cost and time in various markets, including: optical disk (e.g., DVD) or other pre-recorded (e.g., Flash) media distribution, broadcast media (e.g., digital broadcast satellite (DBS), digital cable, digital terrestrial), and point to point (e.g., internet streaming, pay-per-view (PPV), etc.) media distribution.

Existing watermarking schemes involve either (i) expensive decode/playback equipment, (ii) a single watermark for all copies of the content, (iii) an inability to customize individual media or (iv) creation of individualized content for each viewer. Since a great computational burden is imposed on the decode/playback device to impose the watermark in the 'best' way, the decode/playback device is expensive. A single watermark for all copies of the content can convey copy-no-more information, but is not suitable for forensic or copy-once watermarking. For example, in the case of copy once, a recording device is configured to detect the watermark and overlay a copy-no-more watermark. The ability to customize individual media (beyond on/off) or per player is only available when the player is manufactured or specific downloads of new software are performed. Current practice involves the creation of individualized content for each viewer. For example, in the case of award screenings, literally thousands of disks and tapes are individually watermarked and produced at tremendous cost.

It would be desirable to have a method and/or apparatus for recorded video broadcast, streaming, download, and/or disk distribution with watermarking instructions.

SUMMARY OF THE INVENTION

In one embodiment, the present invention concerns an apparatus comprising a first circuit and a second circuit. The first circuit may be configured to analyze an audio-video data stream to determine watermark appropriate information for the audio-video data stream. The second circuit may be configured to communicate the watermark appropriate information either in-band with or out-of-band from a bit stream communicating the audio-video data.

In another embodiment, the present invention concerns an apparatus comprising a first circuit and a second circuit. The first circuit may be configured to detect watermark appropriate information for an audio-video data stream communicated either in-band with or out-of-band from the audio-video data. The second circuit may be configured to embed one or more watermarks in the audio-video data based on the watermark appropriate information.

The objects, features and advantages of the present invention include providing a method and/or apparatus for recording video broadcast, streaming, download, and/or disk distribution with watermarking instructions that may (i) provide for recording, on some media, audio, video and/or other data with watermark appropriate information, (ii) provide a player capable of reading audio video and/or other data and watermark appropriate information, (iii) provide a player capable of inserting a watermark on audio video and/or other presentations based on watermark appropriate information, (iv) provide forensic watermarking without individualized disk or media publishing, (v) reduce costs of providing watermarking and/or (vi) utilize existing tools, storage, content management and distribution equipment.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
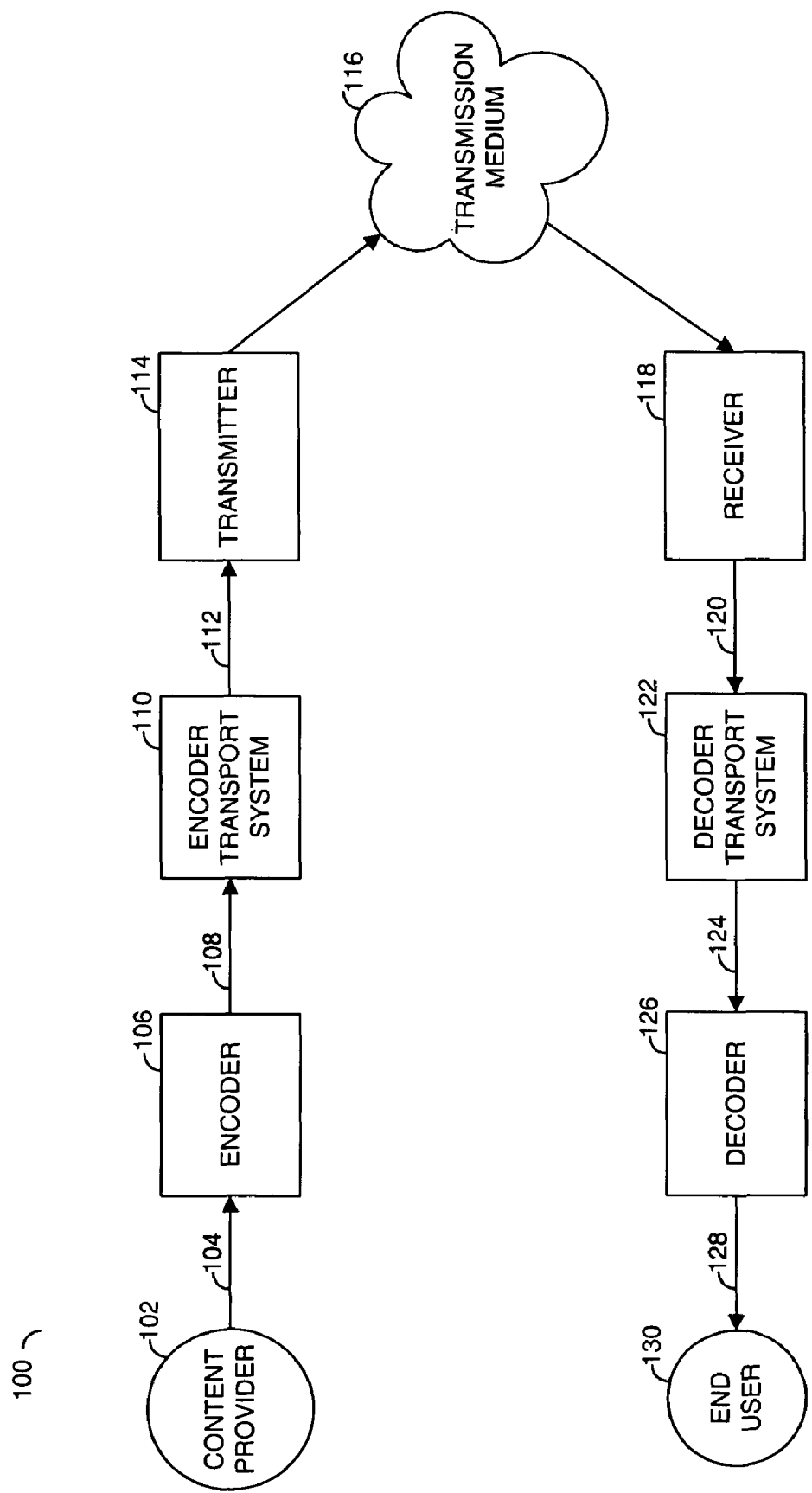
FIG. 1 is a block diagram illustrating various components of a compressed video system in accordance with a preferred embodiment of the present invention.

Referring to FIG. 1, a block diagram of a system 100 in accordance with a preferred embodiment of the present invention is shown. In general, a content provider 102 presents video image, audio or other data to be compressed and transmitted in a data stream 104 to an input of an encoder 106. In one example, the video image, audio and/or other data (e.g., a sequence of still images, etc.) in the data stream 104 may comprise material to be watermarked. The encoder 106 may be implemented in accordance with a preferred embodiment of the present invention. The encoder 106 may be configured to perform spatial, temporal and/or transform domain analysis of the data stream 104 to determine appropriate watermarking (or watermark appropriate) information for the data contained in the data stream 104.

As used herein, watermark (or watermarking) appropriate information generally refers to information (or instructions) concerning how and where one or more watermarks may be embedded in the audio-video data. The watermark appropriate information may further indicate what types of data each of the watermarks may contain. However, the watermark appropriate information generally does not contain the actual data embedded with the watermark. The actual data is generally determined during decoding or playback.

The encoder 106 may be configured to generate a compressed bit stream 108 in response to the input stream 104. In one example, the encoder 106 may be configured to encode the data stream 104 according to one or more encoding (or compression) standards (e.g., MPEG-1, MPEG-2, MPEG-4, WMV, VC-9, VC-1, H.262, H.263, H.264, H.264/JVC/AVC/MPEG-4 part 10, AVS 1.0, Real Networks, Divx Networks, and any other open or proprietary methods for compression of audio-video data). The encoder 106 may be further configured to embed, tunnel and/or otherwise communicate the watermarking appropriate information within the bit stream 108. Alternatively, the encoder 106 may be further configured to provide the watermarking appropriate information outside the bit stream 108 (e.g., in a separate file or bit stream).

The compressed bit stream 108 from the encoder 106 may be presented to an encoder transport system 110. An output of the encoder transport system 110 generally presents a signal 112 to a transmitter 114. The transmitter 114 transmits the compressed data via a transmission medium 116. In one example, the content provider 102 may comprise a video broadcast, DVD, or any other source of video data stream. The transmission medium 116 may comprise, for example, a broadcast, cable, satellite, or data network, a DVD, a hard drive, or any other medium implemented to carry, transfer, and/or store a compressed bit stream. In one example, the blocks 102-114 may represent an authoring portion of the system 100 that may be implemented separately from the rest of the system 100.

On a receiving side of the system 100, a receiver 118 generally receives the compressed data bit stream from the transmission medium 116. The receiver 118 presents an encoded bit stream 120 to a decoder transport system 122. The decoder transport system 122 generally presents the encoded bit stream via a link 124 to a decoder 126. The decoder 126 may be implemented as a separate system in accordance with another preferred embodiment of the present invention. The decoder 126 generally decompresses (decodes) the data bit stream and presents the data via a link 128 to an end user hardware block (or circuit) 130.

The decoder 126 may be configured to detect watermarking appropriate information in-band with and/or out-of-band from the encoded bit stream. The detection of the watermarking appropriate information may be performed prior to, concurrently with, or subsequent to, decoding the encoded bit stream. In one embodiment, the watermarking appropriate information for a frame (e.g., K) may be communicated with a number (e.g., J) of previous pictures (or frames). For example, the watermarking appropriate information for the frame K may be communicated with the pictures K-J through K-1. In one example, the watermarking appropriate information may be spread across or randomly distributed in the J frames to hinder hacking. In another example, the watermarking appropriate information may be duplicated in each of the frames to enhance the robustness of the watermark.

When the watermarking appropriate information is communicated with previous frames, the detection is generally performed prior to the decoding of the picture on which the information is used. When the watermarking appropriate information is detected prior to coding of a picture, the watermark insertion on the picture may be concurrent with the decode of the picture. In one example, sending the watermark appropriate information on a number of previous frames may increase the robustness of the process. For example, sending the watermarking information multiple times increases the likelihood of error-free reception by the decoder. An advantage of the above approach may be that the watermark processing on each macroblock may occur while the macroblock data is still in on-chip memory, rather then writing out an entire picture and having to re-fetch the data for watermark insertion.

When watermark appropriate information is detected, the decoder 126 may be configured to extract the watermark appropriate information and modify presentation of the decoded data to the end user hardware block 130 according to the watermark appropriate information (e.g., embed one or more watermarks according to the watermark appropriate information). The end user hardware block 130 may comprise a television, a monitor, a computer, a projector, a hard drive, a personal video recorder (PVR), an optical disk recorder (e.g., DVD), or any other medium implemented to carry, transfer, present, display and/or store the uncompressed bit stream (e.g., decoded video signal). The blocks 118-130 may represent a player (or playback) portion of the system 100 that may be implemented, in one example, separately from the rest of the system 100.

Figure 2:
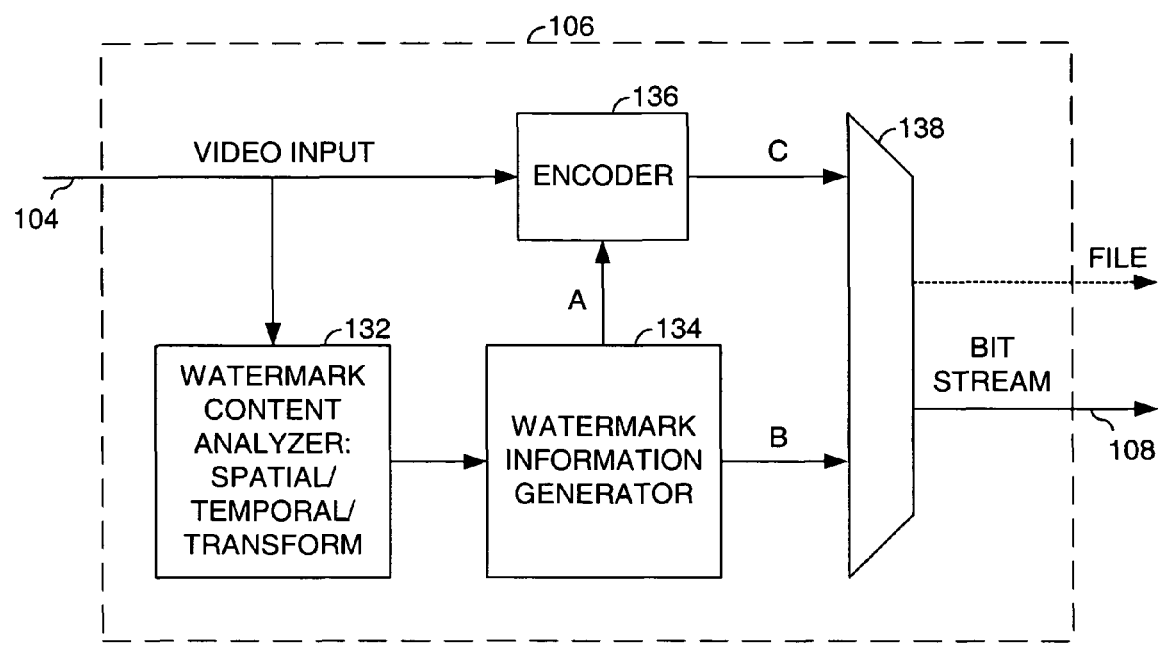
FIG. 2 is a more detailed block diagram illustrating an example encoder in accordance with a preferred embodiment of the present invention.

Referring to FIG. 2, a more detailed block diagram is shown illustrating an example implementation of the encoder 106 in FIG. 1. In one example, the encoder 106 may comprise a block (or circuit) 132, a block (or circuit) 134, a block (or circuit) 136 and a block (or circuit) 138. The block 132 may be implemented, in one example, as a watermark content analyzer circuit (or block). The block 132 may be configured to perform one or more of spatial analysis, temporal analysis and/or transform domain analysis. In one example, the block 132 may be implemented as part of a motion estimation (ME) and/or motion compensation (MC) portion of the encoder 106. The block 134 may be implemented as a watermarking appropriate information generator circuit (or block). The block 138 may be implemented as a multiplexer circuit.

The block 132 may be configured to analyze an audio-video data stream (e.g., VIDEO INPUT) to determine watermark appropriate information (e.g., how and where to embed one or more watermarks) for the audio-video data stream. The block 132 may be configured to perform the spatial analysis, temporal analysis and/or transform domain analysis, in a pixel domain and/or in a transform domain. The transform domain analysis may comprise frequency and/or temporal domain analysis (e.g., DCT, DFT, DHT, Hadamard, wavelet, etc.). The spatial, temporal and/or transform domain analyses may be implemented with conventional techniques. The block 132 may be further configured to communicate analysis results to the block 134.

The block 134 may be configured to communicate the watermark appropriate information (i) to the block 136 (e.g., via a signal A) for embedding in a bit stream comprising the audio-video data (e.g., in-band communication) or (ii) to the block 138 (e.g., via a signal B) for multiplexing with the bit stream (e.g., on another channel or bit stream) or storing in a file (e.g., out-of-band communication). The block 134 may be configured to compress and/or generate watermark appropriate information based on results of the analyses performed by the block 132. For example, the block 134 may be configured to generate vectors for watermark placement.

The block 136 may be configured to encode the audio, video and/or other data sequence including any watermark appropriate information and present the encoded data in a bit stream (e.g., a signal C) to the block 138. The block 136 may be further configured to embed or tunnel the watermark appropriate information in the bit stream. The block 138 may be configured to present the encoded bit stream and/or unencoded watermark appropriate information to the bit stream 108 (e.g., BIT STREAM) and/or one or more files.

Watermark appropriate information may be conveyed within a bit stream in various ways. In a transport level stream, for instance, the watermark appropriate information may be carried in a separate PID, typically associated with an elementary video stream to which the information pertains. Additionally, in the example of an MPEG2 Video elementary stream, the watermark appropriate information may be carried in any of picture, group of pictures (GOP), or sequencer user data, or the watermark appropriate information may be "tunneled".

The watermark appropriate information which is embedded in the elementary stream follows path A to the encoder. The watermark appropriate information to be multiplexed as a separate stream in the same service may be presented to the multiplexor 138 as the signal B and accompanies the bit stream 108.

The content analyzer 132 and the watermark information generator 134 may comprise, as an example, watermark insertion implementations by companies such as Digimarc or Verimatrix. The algorithms may be held as trade secrets or patents, or may be in the public domain. Other methods may also be used and are likely to be developed.

Figure 3:
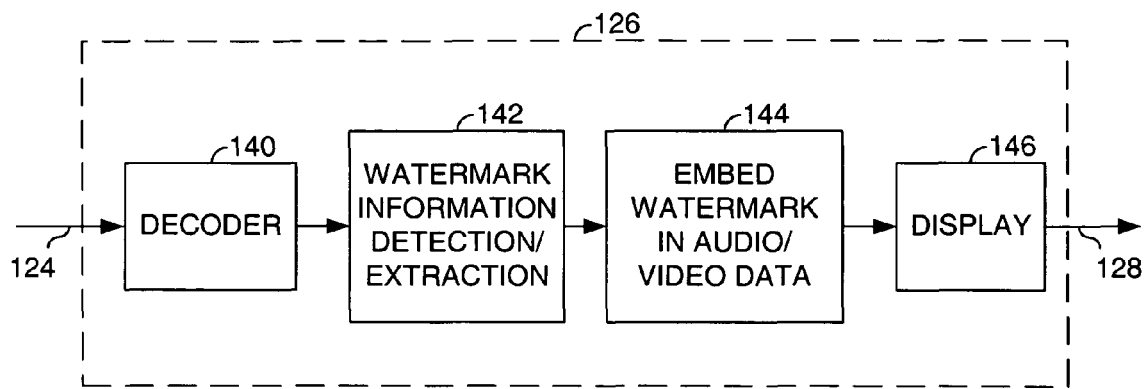
FIG. 3 is a more detailed block diagram illustrating an example decoder in accordance with a preferred embodiment of the present invention.

Referring to FIG. 3, a more detailed block diagram is shown illustrating an example implementation of the decoder 126 in FIG. 1. In one example, the decoder 126 may comprise a block (or circuit) 140, a block (or circuit) 142, a block (or circuit) 144, and a block (or circuit) 146. The block 140 may be implemented, in one example, as a decoder. The block 142 may be implemented, in one example, as a watermark information detector/extractor circuit. The block 144 may be configured to modify audio, video, and/or other data (e.g., embed one or more watermarks) according to the watermark appropriate information retrieved by the block 142. The block 146 may be configured to present, display, or otherwise communicate the audio, video and/or other data with the embedded watermarks.

Conventional methods may be used to insert the watermark using the watermark appropriate information. The conventional methods may include post-decode pixel domain data manipulation or transform domain data manipulation. In motion compensated pictures and macroblocks, when the watermark is inserted in the transform (e.g., DCT) domain, the picture is transformed, the watermark signal is added, and the picture is transformed back to pixels. A watermark insertion for intra pictures (e.g., JPEG, MPEG, H.264, etc.) may be performed in a single pass in the decoder (e.g., after bit stream decode to quantized coefficients and inverse quantization, but before transform to pixel domain).

The block 142 may be further configured to detect and retrieve appropriate watermark information either (i) embedded or tunneled in the bit stream 124 or (ii) provided out-of-band in a separate stream or file. The block 142 may be further configured to communicate the watermark appropriate information to the block 144. The block 144 may be configured to insert one or more watermarks based on the information received from the block 142. The watermarks may be embedded, for example, on a per player, per download, per playback session, and/or per user (e.g., password unlock) basis. The block 144 may be further configured to communicate information about the watermarking to the block 146. The block 146 may be configured to display and/or present the decoded data including any watermarking via the link 128.

Figure 4:
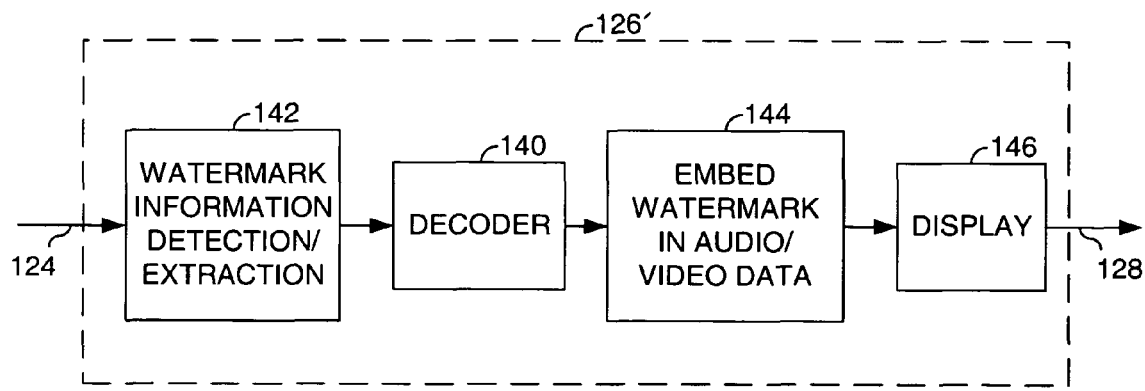
FIG. 4 is a more detailed block diagram illustrating an example decoder in accordance with another preferred embodiment of the present invention.

Referring to FIG. 4, a block diagram of a circuit 126' is shown illustrating an alternative embodiment of the decoder 126 of FIG. 1. In an alternative embodiment, the block 142 may be implemented prior to the block 140. By detecting and extracting watermark appropriate information prior to decoding, the watermark appropriate information may be used by the decoder to directly embed the watermark information during the decoding process. For example, when the watermark appropriate information is contained in one or more preceding frames of the data stream, the watermark appropriate information may be detected and extracted prior to the decoding of the frame in which the watermark is to be embedded. Alternatively, the watermark may be embedded after the decoding process is performed. Although the blocks 140 and 144 are illustrated as separate, the functions of the block 140 and 144 may also be implemented in a single circuit (or block).

Figure 5:
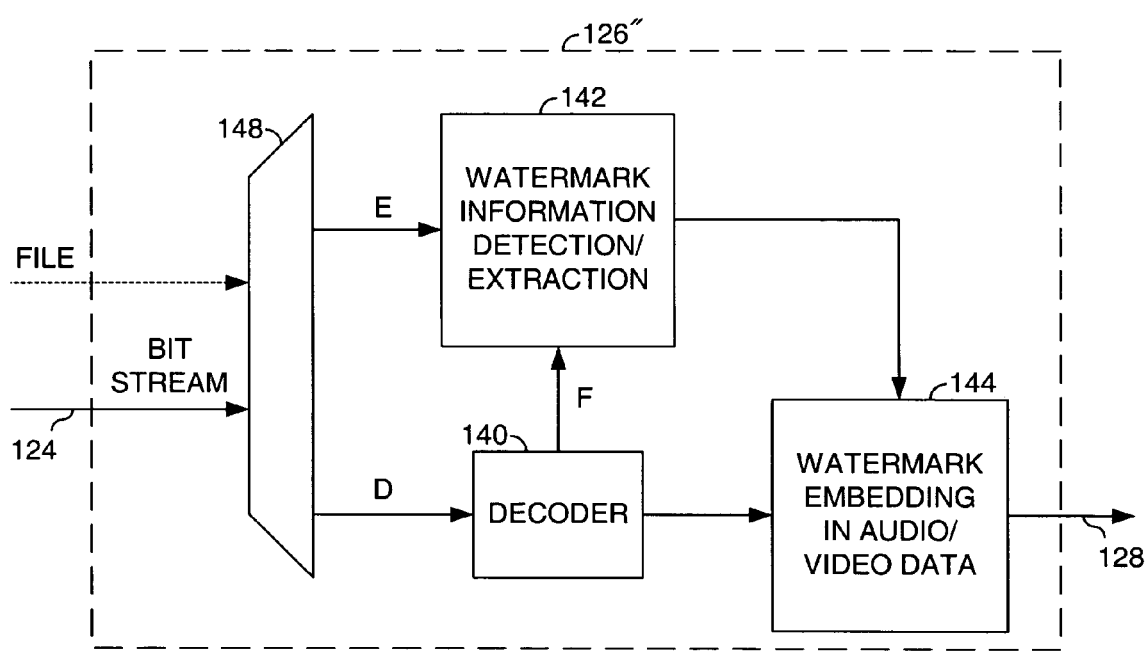
FIG. 5 is a more detailed block diagram illustrating an example decoder in accordance with still another preferred embodiment of the present invention.

Referring to FIG. 5, a block diagram of a circuit 126" is shown illustrating another alternative embodiment of the decoder 126 of FIG. 1. In one example, the bit stream 124 (and/or information from a file) may be presented to a de-multiplexer 148. The de-multiplexer 148 may present an encoded bit stream (e.g., D) to an input of the decoder 140 and unencoded watermark appropriate information (e.g., E) to an input of a watermark information detection/extraction circuit (e.g., the block 142). The decoder 140 may be configured to present watermark appropriate information decoded from the encoded bit stream to a second input of the block 142 (e.g., via a signal F). The block 142 may be configured to present the extracted watermark appropriate information to a first input of the block 144. The decoder 140 may be further configured to present the decoded audio, video and/or other data to a second input of the block 144. The block 144 may be configured to embed one or more watermarks in the audio, video and/or other data. The block 144 may be configured to present the audio, video and/or other data with the embedded watermarking via the link 128.

The encoder 106 and the decoder 126 may be implemented in hardware, software (or firmware) or a combination of hardware and software. Although the encoder 106 and the decoder 126 have been illustrated with particular arrangements of elements, other appropriate arrangements of components may be implemented accordingly to meet the design criteria of a particular implementation, as will be readily apparent to those skilled in the pertinent art(s). The present invention may be implemented by the preparation of ASICs, FPGAs, or by interconnecting an appropriate network of conventional component circuits according to the teachings of the present specification, as will be readily apparent to those skilled in the art(s). Appropriate software coding can readily be prepared by skilled programmers based on the teachings of the present disclosure, as will also be apparent to those skilled in the relevant art(s).

The present invention generally provides a method and/or apparatus for recording, storing, and/or distributing audio, video and/or other data with watermark appropriate information on some medium. In one embodiment, the present invention may implement a player that reads audio and/or video data and watermark appropriate information from the medium, and, based on the watermark appropriate information, insert one or more watermarks on the audio and/or video data. In general, the information embedded in the watermarks may be determined by the particular application. For example, depending on the application, the watermark may comprise information about the player ID, time and date information, user ID information, password information and/or or general copy no more information. However, other types of information may be implemented accordingly to meet the design criteria of a particular application. The present invention may provide a method for deducing how and where to embed the watermark information rather than determining the actual embedded data of the watermark.

For simplicity, the example chosen in this disclosure is that of an optical disk with watermarking. However, it will be clear to those skilled in the art that the present invention is equally applicable to other media distribution methods and markets, among which are specifically broadcast (cable, DBS, digital terrestrial, etc.) and the internet. Additionally, as used herein, "disk" generally refers to any storage medium, for instance flash memory, optical, magnetic disk, etc. The term "audio-video" as used herein generally refers to audio and video data, as well as individual and/or sequences of still images (e.g., JPEG, etc.) and any other types of data that may benefit from watermarking, either individually or together.

In forensic watermarking, it is generally desirable that the video image be corrupted in a way that does not materially degrade the visual quality of the video. However, it may be desirable to have a more visible watermark inserted (e.g., as a decoy, where watermark removal is a possibility). Conventional methods are known that can locate areas (e.g., which parts of which frames) where such corruption will have minimal material impact on the displayed video quality. Then, multiple disks are authored (e.g., one for each award reviewer). In the conventional approach, the corruption used on each disk is different, so that if a disk is copied the specific disk that was copied may be tracked down.

The present invention may employ conventional methods to locate areas where watermarking corruption will have minimal material impact on the decoded video quality. A number of identical disks may be produced, where each disk includes watermarking appropriate information (e.g., information about how and where the video may be corrupted for watermarking) recorded on the disk. In one example, the disks may have unique identification numbers embedded, as is the case with copy protection for pre-recorded media (CPPM) disks used for DVD-Audio or copy protection for recordable media (CPRM) disks used in DVD-RW and DVD-RAM. The unique identification numbers are generally embossed in the disk manufacturing process. However, the audio/video/data content is generally identical.

A player that plays a disk in accordance with the present invention may be configured to insert one or more watermarks during playback on an intended area determined based on the watermarking appropriate information recorded on the disk. The exact nature of the watermark may be unique for each player or play back session. When a player is used to copy the content (e.g., to another disk, a hard drive, a flash drive, a video tape, etc.), the player, and even the date and time, may be identified.

The present invention provides that each player is generally "personalized". For example, a DVD player may have a non-volatile memory for storing micro-code and other information. The personalization may be accomplished by storing different information in a flash memory or other non-volatile storage in each player.

In one example, a forensic watermarking system in accordance with the present invention may be implemented in the following way. Special individualized players may be manufactured for distribution. Disks may be manufactured that only play in the special individualized players. In one example, advanced encryption may be used to limit a particular disk to a particular player. However, other techniques for controlling access to the contents of a disk may be implemented accordingly to meet the design criteria of a particular implementation.

The present invention may facilitate forensic watermarking. For example, if the "advanced encryption" is not broken and the content is copied, the offending player may be identified based on the watermark(s) added by the individualized player. The present invention may support future player standards (or specifications) that may specify insertion of video watermarks, perhaps due to legislation, license agreements, or for specialized applications, such as advanced viewing by media film critics. Watermarking the video (and/or other types of data) may provide a deterrent to unauthorized copying and distribution of the content, inasmuch as the violation of the license agreement may be tracked back to a particular user.

It is generally desirable to the value of the content that the watermark be unobtrusive, yet survivable. Because the watermark is customized for each player, the watermark is generally inserted by the player and not in the authoring and encoding process. However, additional watermarks (e.g., copy_once and copy_no_more) may be inserted in the encoding process. In addition, watermarks using different technologies may be implemented separately or in combination in a player. Multiple watermarks may be implemented allowing the authoring agent to select particular watermarks based on predetermined criteria (e.g., for strength, obtrusiveness, royalties, etc.).

The evolution of technology may yield improved watermarking methods and algorithms, but legacy receiver/players may have been deployed prior to the availability, use or requirement of the newer approaches. The present invention allows for conveying watermark appropriate information for multiple watermark insertion schemes. The data conveyed to the receiving side may be unique per watermark technology or may re-use all or part of the information sent for other watermark technologies or purposes. Players may selectively employ one or more of the available watermark methods, according to internal rules or as dictated by the bit stream, an external application or conditional access system.

The player/receiver may optionally embed multiple watermarks into the same stream, according to one or more technologies. The watermarks may coexist on the same frame, may be interleaved on different frames according to whatever rule the application, receiver, or other interested party may dictate. Different strengths or embedding criteria may be dictated for different watermarking technologies or watermark data.

The present invention may involve the application of a complex perceptual model, involving spatial and temporal analysis of the real-time audio-video data. The perceptual model may be computationally very expensive (e.g., one commercial algorithm involves 660 Million floating point operations per second for standard definition video) and prohibitively expensive for implementation in low cost consumer playback devices.

The output of the modeling may provide a data vector per frame, describing the location within the particular frame where watermark data may best be embedded. The definition of "best" generally depends on the application. For example, best may be interpreted as any of (i) 'most survivable' (e.g., with respect to scaling, cropping, rotating, warping, shifting, filtering, etc.), (ii) 'least obtrusive' and (iii) subject to other constraints. The other constraints may include one or more predetermined locations, other criteria for improving the ease of watermark detection, making the watermark more or less prevalent and/or aggressive in different parts of the content (e.g., strong watermark insertion at beginning or end). The location where watermark data may best be embedded may depend on the spatial and temporal (even non-causal, taking into account future pictures as well as previous ones) characteristics of each frame. For example, the location may depend on the scene and context of each frame.

In general, the perceptual modeling may be the same for a given content (e.g., the modeling may be similar on every movie). Because the perceptual modeling may be similar for a given content, the computation and cost burden of the model may be most efficiently borne in the authoring process. The present invention generally enables the output of the model to be conveyed in the bit stream containing the audio-video data (e.g., in-band) or in a separate bit stream or file (e.g., out-of-band). For example, in a video stream, the output of the model is generally associated with the picture to which the output applies (e.g., frame-accurate).

The present invention generally has no impact on the rest of the editing, authoring, or production flow. The lack of impact is a huge advantage, inasmuch as managing additional streams and authoring tools, and synchronizing additional data frame-accurate in the production flow may be a significant barrier to adoption. Because the existing authoring, storage, routing, and editing infrastructure may be employed with the present invention, time to market may be accelerated. For example, for authored content the watermark appropriate information may be carried in an additional data file that may be supplied on the disk or via another medium.

The present invention may greatly simplify a decoding and/or display process involving watermarking. The present invention may virtually eliminate any cost to the industry of deploying the watermarking technology. Providing a watermark with a decoder implemented in accordance with the present invention generally involves processing a small amount of the pixel, coefficient or bit stream data. The marginal burden on the decoder is generally tiny compared with the alternative of running the full perceptual model. Furthermore, when the watermark appropriate information (or data) is conveyed in the encoded bit stream, the watermark appropriate information is generally kept frame accurate and delivered directly to the video decoder/pixel processor, minimizing the impact on decoder software. Furthermore, because the watermark appropriate information is conveyed with the picture to which the watermark appropriate information applies frame accurate in the encoded bit stream, the watermarking information is generally not impacted by trick-play (fast forward, step, pause, reverse, scaling) scenarios.

Players from different manufacturers and/or developed at different times may differ in the implementation, processing power, and ability to analyze and identify where the watermark data may best be embedded. The present invention allows for standard and consistent watermark analysis and insertion to be achieved. Moreover, with a database of the watermark insertion database, the problem of forensic or on-the-fly detection of watermarked data may be simplified in that the detector may not need to search throughout the content to determine where the watermark may have been inserted. Instead the detector may have access to knowledge of where the watermark would have been placed.

The present invention may be implemented in a variety of applications. In internet streaming, specialized PC decoders abound for various (typically compressed) video formats. In one example, the present invention may be implemented such that Real Networks, Divx Networks, or Microsoft proprietary software video compression technology utilize the Pentium ID code to identify a PC on which a given stream was decoded. If ripped streams from the PC appear on the web, the 'license' of the particular PC to download and decode may be identified and various actions taken to enforce the rights of the content owner. In another example, broadcast (e.g., digital cable or satellite) receivers may be configured to embed watermarks utilizing smart card or other box ID information. License violations (e.g., ripped streams) may be detected and the offending user/device disabled. In still another example, the present invention may be implemented to close the 'analog hole' and embed user specific watermarks to identify license violations and add a box to the license revocation list. In general, the present invention may enable minimal cost playback devices for the above applications. The content owner generally has a strong interest in deploying the watermarking technology.

In general, the present invention may provide an encoding system method and/or apparatus for performing spatial, temporal, and/or transform domain video analysis for a perceptual model on a moving picture sequence and conveying the result of the analysis in the bit stream including the moving picture sequence. In addition, the result of the analysis may be conveyed frame-accurate. For example, in a preferred embodiment, the result of the analysis may be conveyed directly in the picture to which the result applies. However, other embodiments may provide the result some time before or after (e.g., with one or more preceding or succeeding frames).

The present invention generally provides for watermark (identifier) embedding at the decoder based on information received from the encoder. The spatial and temporal analysis may be performed in the pixel domain or the transform domain. The present invention may be implemented with streams complying with any of MPEG1, MPEG2, MPEG4, WMV, VC-9, VC-1, H.264/JVC/AVC/MPEG-4 part 10, real Networks, Divx Networks, or other open or proprietary compressed video standard or method. However, the present invention may also be implemented with video that is not compressed. For example, the result of the analysis may be stored or conveyed in the vertical or horizontal blanking interval (VBI or HBI), in an associated audio channel or in the active video itself (e.g. in least significant chroma bits). In one example, information regarding the watermark strength and algorithm data may be embedded in the media stream.

The present invention may also provide a decoding method and/or apparatus wherein the watermarking information is extracted, in one example, from the video content. The receiving/decoding system may perform any combination of the following functions: optical disk player, broadcast receiver (e.g., DBS, Digital Cable, Digital terrestrial), point to point streaming or download (e.g., internet), still picture display, point-to-point communication (e.g., cellular telephone) or other non-volatile memory reader (e.g. FLASH memory card).

In general, the present invention provides a watermark solution that is flexible to the content application. For example, different content sent to the same player may have different definitions of how important survivability is as opposed to obtrusiveness. A trade of between survivability and obtrusiveness may be customized by the content owner on a per-content and even per-player basis (e.g., premium customers may be able to pay more for a less obtrusive watermark).

The present invention generally provides advantages over conventional solutions. For example, the present invention may provide forensic watermarking without individualized disk or media publishing. Since individualized disk publishing is expensive, the present invention may save money. While in one aspect the present invention provides individualized players, the implementation of individualized players generally involves a one-time expense. In general, the present invention may involve no additional cost (i) on the decoder/ receiver/player devices or (ii) to the consumer of the content. Similar cost advantages may accrue in broadcast or streaming applications. Additional advantages may be realized in the authoring and content generation process through the use of existing tools, storage, and content management and distribution equipment. Furthermore, the present invention generally does not involve retraining staff or modifying the production process.

In another embodiment, the decoder may be configured to detect and/or receive a signal from the encoder indicating the presence of watermark appropriate information. In one example, the information concerning watermarking may be communicated by the encoder using a tunneling method as described in a co-pending application U.S. Ser. No. 10/939,786, filed Sep. 13, 2004, which is hereby incorporated by reference in its entirety. In another example, the information concerning watermarking may be embedded in user data areas within the bit stream. However, embedding the information in user areas should be performed carefully since using the user data structures may conflict with other uses of the data area or confuse decoders not configured to anticipate the presence of such user data.

In one example, the encoder may be configured to generate an elementary bit stream in such a way that syntax elements whose meaning has nothing to do with the watermarking process may be used to signal the presence of watermark appropriate information in the bit stream. The use of syntax elements to signal the presence of watermarking information is possible because the process for encoding frames is non-normative. In other words, an encoder has many options in the encoding details of the stream sent. For example, in many compression formats (e.g., MPEG-1, MPEG-2, MPEG-4, H.264, VC-9, VC-1, etc.) headers are byte aligned.

In one example, an encoder may be configured to insert additional bytes of zeros before headers. The number of zeros used before a particular header may be used to signal the presence of watermark appropriate information. For example, no extra zeros may indicate the stream is not to be watermarked; 1 extra zero may indicate the stream is to be watermarked but the current picture is not; 2 extra zeros may indicate the stream is to be watermarked and the current picture is an appropriate location. In another example, the quantization value in a first macroblock in a picture may be used to signal the status. In yet another example, the difference between the first two quantization values in the picture may be used to signal the status. However, other signaling schemes may be implemented accordingly to meet the design criteria of a particular implementation.

The function performed by the flow diagrams of FIGS. 4 and 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing information.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to analyze an audio-video data stream to determine watermark appropriate information for said audio-video data stream, wherein said watermark appropriate information describes a location within said audio-video data where a watermark can be embedded and said watermark is embedded in said audio-video data during playback by a decoder based upon said watermark appropriate information and watermark data stored in said decoder, wherein said watermark data stored in said decoder is unique to said decoder; and
a second circuit configured to communicate said watermark appropriate information either in-band with or out-of-band from a bit stream comprising said audio-video data.

2. The apparatus according to claim 1, wherein said watermark appropriate information is communicated out-of-band in one or more of (i) one or more separate files on a medium communicating said audio-video data stream, (ii) a separate bit stream within the medium communicating said audio-video data stream, (iii) one or more separate communication channels, and (iv) one or more different communication media than said audio-video data stream.

3. The apparatus according to claim 1, wherein analyzing said audio-video data stream comprises a spatial analysis.

4. The apparatus according to claim 1, wherein analyzing said audio-video data stream comprises a temporal analysis.

5. The apparatus according to claim 1, wherein analyzing said audio-video data comprises transform domain analysis.

6. The apparatus according to claim 1, wherein analyzing said audio-video data stream comprises performing two or more analyses selected from the group consisting of spatial analysis, temporal analysis and transform domain analysis.

7. The apparatus according to claim 1, wherein said watermark appropriate information is determined according to a predetermined perceptual model involving spatial and temporal analysis of the audio-video data in real-time.

8. The apparatus according to claim 1, wherein said second circuit is further configured to perform a frame-accurate conveyance of said watermark appropriate information.

9. The apparatus according to claim 8, wherein said second circuit is further configured to convey said watermark appropriate information within the data to which said watermark appropriate information pertains.

10. The apparatus according to claim 8, wherein said second circuit is further configured to convey said watermark appropriate information in either (i) one or more previous frames or (ii) one or more subsequent frames with respect to a frame to which said watermark appropriate information pertains.

11. The apparatus according to claim 1, wherein said watermark appropriate information comprises information concerning how to embed said watermark in said audio-video data during decoding of said bit stream.

12. The apparatus according to claim 1, wherein said watermark appropriate information comprises information for instructing said decoder to embed said watermark based on one or more conditions selected from the group consisting of per player, per download, per playback session and per user.

13. The apparatus according to claim 1, wherein said second circuit is further configured to communicate information regarding watermark strength and watermark creation embedded in said bit stream.

14. The apparatus according to claim 13, wherein said information regarding watermark strength and watermark creation comprises information regarding survivability and obtrusiveness.

15. The apparatus according to claim 14, wherein said information regarding survivability and obtrusiveness is customizable by a content owner on one or both of a per-content basis and a per-player basis.

16. The apparatus according to claim 1, wherein said bit stream is compliant with an encoding standard selected from the group consisting of MPEG-1, MPEG-2, MPEG-4, WMV, VC-9, VC-1, H.262, H.263, H.264, H.264/JVC/AVC/MPEG-4 part 10, AVS 1.0, Real Networks, Divx Networks, Macromedia and other open or proprietary methods for compression of audio-video data.

17. The apparatus according to claim 1, wherein said audio-video data stream is not compressed and said watermark appropriate information is stored or communicated with said audio-video data stream.

18. The apparatus according to claim 17, wherein said watermark appropriate information is communicated via one of a vertical blanking interval (VBI), a horizontal blanking interval (HBI), a sub-picture unit (SPU), one or more chroma bits.

19. A method for watermarking audio-video data comprising the steps of:
performing one or more analyses selected from the group consisting of spatial analysis, temporal analysis and transform domain analysis, on said audio-video data in an encoder; and
communicating a result of said one or more analyses from said encoder to a decoder either in-band with or out-of-band from a bit stream comprising said audio-video data, wherein a watermark is embedded in said audio-video data by said decoder during playback based upon said result of said one or more analyses and watermark data stored in said decoder, wherein said watermark data stored in said decoder is unique to said decoder.

20. The method according to claim 19, further comprising:
creating a watermark appropriate information database comprising watermark insertion meta data; and
performing forensic or on-the-fly detection of watermarked data based upon watermark insertion meta data retrieved from the database.

21. An apparatus for decoding a compressed bit stream comprising:
a first circuit configured (i) to detect watermark appropriate information communicated in-band with or out-of-band from an audio-video data bit stream and (ii) to extract said watermark appropriate information, wherein said watermark appropriate information describes a location within said audio-video data where a watermark can be embedded in said audio-video data by said apparatus during playback; and
a second circuit configured to embed one or more watermarks in said audio-video data at playback based upon said watermark appropriate information and watermark data stored in said apparatus, wherein said watermark data stored in said apparatus is unique to said apparatus.

22. The apparatus according to claim 21, wherein said apparatus is configured to perform any combination of functions selected from the group consisting of (i) optical disk player, (ii) broadcast receiver for any of digital broadcast satellite, digital cable and digital terrestrial, (iii) point-to-point streaming, (iv) point-to-point download and (v) non-volatile storage reader.

23. The apparatus according to claim 21, wherein said apparatus is configured to retrieve watermark insertion meta data from a database and perform forensic or on-the-fly detection of watermarked data based upon the watermark insertion meta data.

24. The apparatus according to claim 23, wherein said apparatus is configured to inspect a watermark overlay using information retrieved from said database.

25. A method for decoding a compressed bit stream comprising:
detecting watermark appropriate information communicated from an encoder either in-band with or out-of-band from an audio-video data bit stream, wherein said watermark appropriate information describes a location within said audio-video data where a watermark can be embedded in said audio-video data by a decoder during playback;
extracting said watermark appropriate information; and
embedding one or more watermarks in said audio-video data during playback using said decoder based on said watermark appropriate information and watermark data stored in said decoder, wherein said watermark data stored in said decoder is unique to said decoder.

26. The method according to claim 25, wherein said watermark appropriate information is communicated out-of-band in one or more of (i) one or more separate files on a medium communicating said audio-video data stream, (ii) a separate bit stream within the medium communicating said audio-video data stream, (iii) one or more separate communication channels, and (iv) one or more different communication media than said audio-video data stream.

27. The method according to claim 25, wherein said one or more watermarks are embedded based on one or more conditions selected from the group consisting of per player, per download, per playback session and per user.

28. The apparatus according to claim 1, wherein the watermark appropriate information does not contain the actual watermark data embedded in the audio-video data.

29. The method according to claim 19, wherein said watermark identifies a device on which the audio-video data is decoded for playback.

30. The method according to claim 19, wherein said result of said one or more analyses provides watermark appropriate information that comprises a data vector describing a location within a particular frame where the watermark data can be embedded by the decoder.

31. The apparatus according to claim 1, wherein the actual watermark data is determined during decoding or playback.

* * * * *